Patented Mar. 16, 1937

2,073,796

UNITED STATES PATENT OFFICE 2,073,796

COATING COMPOSITION

Charles B. Hemming, Parlin, N. J., assignor to E. I. du Pont de Nemours & Company, Wilmington, Del., a corporation of Delaware No Drawing. Application August 28, 1935, Serial No. 38,213

9 Claims. (Cl. 91—68)

This invention relates to coating compositions for finishing surfaces with a high gloss and more particularly to the preparation of paper to be used for labels and for wrapping small packages. Heretofore, lithographed or printed paper labels have been available, either uncoated or coated, with a clear varnish consisting of one or more natural resins such as congo, copal, or kauri dissolved in alcohol. These spirit varnishes vary greatly in quality, some of which are not adapted to form a smooth flexible film. Certain of the better ones, however, may be applied to paper by roller coating and in such cases definite improvement in the appearance of the paper to which they are applied is obtained.

Varnishes prepared in this manner, however, have very poor resistance to abrasion and when used for wrapping small packages which are packed together in a carton very often chafe badly due to the rubbing of one varnished surface against the other. Another disadvantage of such coatings is that the flexibility is very poor when sufficient resin is added to give a satisfactory gloss. If heavier films are applied to paper, a dark color is invariably imparted to the label, and when chafing takes place the fine white scratches impair the appearance of the finished article. These varnishes have the further disadvantage that when a substantial film is applied they dry very slowly and are sensitive to heat and moisture, and are therefore tacky and stick together under adverse conditions.

The objects of this invention are to provide a coated paper having a high gloss of unusual brilliancy and which is resistant to abrasion.

Another object is the provision of a method of preparing paper surfaces which are flexible as well as resistant to heat and water. Other objects will appear hereinafter.

These objects are accomplished by applying a coating composition containing a semi-drying, blown vegetable oil of certain specific chemical and physical characteristics as described hereinafter to a paper base.

In the practice of the present invention, the preparation and ingredients of the composition to be applied to the paper base are comparatively critical. The composition which I prefer contains a low viscosity cellulose nitrate, a solvent or mixtures thereof of medium and high vapor pressure, diluents, one or more resins, and a special plasticizer.

The plasticizer which I have found to be particularly satisfactory is blown cottonseed oil, and is prepared by blowing the raw oil at an elevated temperature, but not exceeding 250° F., until partial polymerization takes place. This oil has a characteristic odor which may be objectionable in certain cases. Under such conditions, the oil may be rendered practically odorless by subjecting it to steam distillation under reduced pressure. There are other methods of obtaining the same result and any of these will be found satisfactory provided care is taken to prevent depolymerization.

The following formulas are given to illustrate satisfactory compositions for coating paper according to my invention:

*Formula #1*

| | Percent |
|---|---|
| Cellulose nitrate (½" viscosity) | 12.8 |
| Denatured alcohol 95% | 7.3 |
| Absolute ethyl alcohol | 7.5 |
| Ethyl acetate 99% | 3.2 |
| Ethyl acetate 83–88% | 19.5 |
| Butyl acetate | 9.2 |
| Toluol | 19.5 |
| Blown cottonseed oil | 16.2 |
| White oil | 1.4 |
| Ester gum | 3.4 |
| | 100.0 |

*Formula #2*

| | Percent |
|---|---|
| Cellulose nitrate (½" viscosity) | 13.2 |
| Denatured alcohol 95% | 5.6 |
| Isobutyl acetate | 10.0 |
| Ethyl acetate 99% | 4.4 |
| Isobutyl alcohol | 5.9 |
| Toluol | 39.1 |
| Deodorized blown cottonseed oil | 16.6 |
| White oil | 1.7 |
| Ester gum | 3.5 |
| | 100.0 |

The first of these formulas illustrates the use of ordinary blown cottonseed oil and the second represents a composition in which deodorized blown cottonseed oil may be used. These lacquers may be prepared by any of the well known methods known to those skilled in the art. The prepared composition is then applied to a suitable paper base by spraying, dipping, knife coating, roller coating, etc.

Ordinarily, in cases where the coated paper is to be used as labels or wrappers for small packages, the paper base is printed in the usual way and the compositions herein disclosed may be applied immediately thereafter whether the ink is dry or not. Subsequently, the label or wrapper is cut out by means of a suitable die and wrapped or attached to the package, usually by machinery.

The blown cottonseed oils used in the above formulas have a refractive index of approximately 1.478 and an iodine number of about 60 to 80 cg/gm. (Wijis). The saponification number usually follows between 220 and 256 mg. of KOH/gm., and the viscosity is over 2200 cp.

Other semi-drying blown vegetable oils, especially those in which non-drying rather than drying properties are more pronounced having approximately the same refractive index, viscosity, saponification and iodine numbers as blown cottonseed oil and which are compatible with cellulose nitrate, may be used. Drying oils such as linseed are not satisfactory, nor are certain of the non-drying oils or semi-drying oils, such as castor, rape, and cocoanut oils. Corn oil on the other hand has been found to be satisfactory. In the examples, the use of ester gum as a suitable resin has been illustrated; however, I may use certain of the alkyd resins such as the cocoanut oil modified glycerol phthalate type, or toxilic acid modified rosin esters such as those sold under the trade name of "Amberol[801]" or "Beckacite[110]". Certain of the natural resins such as dammar have also been found satisfactory.

In certain compositions it is possible to eliminate resins or gums entirely. In such cases for each 10 parts of cellulose nitrate the blown cottonseed oil may vary between 8 and 18 parts by weight. The other ingredients such as solvents and diluents may be varied to give the consistency desired. Where a resin is used, for example 2½ parts of ester gum, the blown oil may vary between 8 and 16 parts. Where the resin is increased to between 5 and 10 parts, the blown oil may vary between 10 and 16 parts by weight. In expressing these limits, it is understood that in each case 10 parts of cellulose nitrate are used.

The viscosity of the cellulose nitrate may be varied between .05 and 5 seconds as determined according to procedure outlined in A. S. T. M. Specification D–301–33. The unusual compatibility of these oils with nitrocellulose permit the production of good coatings even with nitrocellulose degraded to .05 sec. viscosity characteristic. Viscosities considerably higher than these have not been found to be particularly satisfactory. In the compositions discussed above as well as those given by way of illustration, one part of the blown cottonseed oil or corn oil may be replaced by one part of dibutyl phthalate or of tricresyl phosphate. In fact this is sometimes desirable to increase the compatibility of the ingredients.

It will be obvious that the compositions herein disclosed may be applied to both sides of the paper which is subsequently to be the label or wrapper. This has the advantage that it imparts to the same an extraordinarily high degree of resistance to water.

The coating compositions herein described may be used for finishing surfaces of flexible pellicles such as papers, fabrics of all kinds, regenerated cellulose and the like, and is particularly adapted to provide a surface coating to decorative labels, shelf paper, candy wrappers, display cards, fancy papers of all kinds, catalog covers, food cartons and wrappers, wall paper, paper oil containers, and labels for bottles containing alcoholic beverages because of the unusual resistance to alcohol afforded by these compositions.

The present invention offers as an advantage an extraordinarily high gloss and brilliant clarity and depth of film which have heretofore been unknown in the art. A further advantage is that the coating is flexible and maintains this flexibility on aging and does not chafe or scuff when packed together and remains resistant to fats, oils, alkalies, and acids. A still further advantage resides in the fact that the coating may be applied to printed base material while the ink is still wet; moreover, it dries rapidly with good adhesion and does not discolor nor become brittle.

It is apparent that many widely different embodiments of this invention may be made without departing from the spirit and scope thereof; and, therefore, it is not intended to be limited except as indicated in the appended claims.

I claim:

1. Process of preparing labels and the like which comprises applying as a surface coat a lacquer containing low viscosity cellulose nitrate and a blown semi-drying vegetable oil, said oil having an iodine number between 60 to 80 cg/gm.

2. Process of claim 1 in which the oil is cottonseed oil.

3. Process of claim 1 in which the lacquer contains a natural resin.

4. Process of claim 1 in which the lacquer contains a synthetic resin.

5. A printed label having a surface coat of a composition containing a cellulose derivative and a blown semi-drying vegetable oil compatible therewith, said oil having an iodine number between 60 to 80 cg/gm.

6. Product of claim 5 in which the cellulose derivative is low viscosity cellulose nitrate.

7. Product of claim 5 in which the composition contains a solvent plasticizer and a resin.

8. Product of claim 5 in which the label is coated on both sides with the said composition.

9. Process of preparing articles of the class herein described which comprises printing a design on a sheet of paper and applying thereto a coating of a composition having approximately the following formula:

| | Percent |
|---|---|
| Cellulose nitrate (½" viscosity) | 13.2 |
| Denatured alcohol 95% | 5.6 |
| Isobutyl acetate | 10.0 |
| Ethyl acetate 99% | 4.4 |
| Isobutyl alcohol | 5.9 |
| Toluol | 39.1 |
| Deodorized blown cottonseed oil | 16.6 |
| White oil | 1.7 |
| Ester gum | 3.5 |
| | 100.0 | and allowing the same to dry.

CHARLES B. HEMMING.